US008725660B2

(12) United States Patent
Forman et al.

(10) Patent No.: US 8,725,660 B2
(45) Date of Patent: May 13, 2014

(54) APPLYING NON-LINEAR TRANSFORMATION OF FEATURE VALUES FOR TRAINING A CLASSIFIER

(75) Inventors: George H. Forman, Port Orchard, WA (US); Martin B. Scholz, San Francisco, CA (US); Shyam Sundar Rajaram, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1140 days.

(21) Appl. No.: 12/512,243

(22) Filed: Jul. 30, 2009

(65) Prior Publication Data

US 2011/0029463 A1 Feb. 3, 2011

(51) Int. Cl.
*G06F 15/18* (2006.01)
(52) U.S. Cl.
USPC .............................. 706/12; 382/159; 382/161
(58) Field of Classification Search
USPC ..................................... 706/12; 382/159–161
See application file for complete search history.

(56) References Cited

U.S. PATENT DOCUMENTS

| 6,839,680 | B1 | 1/2005 | Liu et al. |
| 6,892,163 | B1 * | 5/2005 | Herzog et al. ................. 702/181 |
| 7,600,017 | B2 * | 10/2009 | Holtzman et al. ............ 709/224 |
| 2003/0101449 | A1 | 5/2003 | Bentolila et al. |
| 2004/0059697 | A1 | 3/2004 | Forman |
| 2005/0060295 | A1 * | 3/2005 | Gould et al. ...................... 707/3 |
| 2006/0101014 | A1 | 5/2006 | Forman |
| 2006/0246466 | A1 * | 11/2006 | Sandvik et al. .................... 435/6 |
| 2008/0101689 | A1 * | 5/2008 | Forman ......................... 382/159 |
| 2008/0126176 | A1 | 5/2008 | Iguchi |

OTHER PUBLICATIONS

"The pyramid match kernel: discriminative classification with sets of image features", Grauman, K., Computer Vision, 2005. ICCV 2005. Tenth IEEE International Conference on Oct. 17-21, 2005, vol. 2, pp. 1458-1465.*
Fenstermacher et al.; "Mining Client-Side Activity for Personalization" Department of Management Information Systems, Eller College of Business and Public Administration, University of Arizona, Jun. 2002, 8 pages.
Baoyao, Zhou; "Intelligent Web Usage Mining" Nanyang Technological University, Division of Information Systems, School of Computer Engineering, 2004, 94 pages.
Baynote Inc.: "The Collective Intelligence Platform," Online, http://www.baynote.com/technology/platform/2010.
Hottolink Inc.; "Reconize" Online, http://www.hottolink.co.jp/english/reconize.html, 2009.
Hongjun Lu et al: "Extending a Web Browser with Client-Side Mining", Hong Kong University of Science and Technology Department of Computer Science, Clear Water Bay, Kowloon, Hong Kong, China, 2003, 12 pages.

(Continued)

*Primary Examiner* — Kakali Chaki
*Assistant Examiner* — Mai T Tran

(57) ABSTRACT

A collection of labeled training cases is received, where each of the labeled training cases has at least one original feature and a label with respect to at least one class. Non-linear transformation of values of the original feature in the training cases is applied to produce transformed feature values that are more linearly related to the class than the original feature values. The non-linear transformation is based on computing probabilities of the training cases that are positive with respect to the at least one class. The transformed feature values are used to train a classifier.

20 Claims, 4 Drawing Sheets

(56) References Cited

OTHER PUBLICATIONS

Shankar et al.; "Personalized Web Search Based on Client Side Ontology", CS 498: B.Tech Project, 10. IIT Kanpur, India 2010, 9 pages.

Sendhikumar et al.; "Personalized ontology for web search personalization" 4. Anna University, Chennai, India , 2008, 7 pages.

Shahabi et al.; "Yoda an Accurate and Scalable Web based Recommendation System?" University of Southern California, Los Angeles, Sep. 2001, 14 pages.

Claypool et al., "Implicit Interest Indicators", Worchester Polytechnic Institute, Worchester, Computer Science Department Worchester Polytechnic Institute Worchester, MA 01609, USA., 2001.

Shahabi et al., "A Framework for Efficient and Anonymous Web Usage Mining Based on Client-Side Tracking", University of Southern California, Los Angeles, 2002.

Forman et al., Feature Shaping for Linear SVM Classifiers, HPL-2009-31R1, May 6, 2009 (11 pages).

* cited by examiner

APPLYING NON-LINEAR TRANSFORMATION OF FEATURE VALUES FOR TRAINING A CLASSIFIER

BACKGROUND

A classifier (also referred to as a categorizer) is often used in data mining applications to make a decision about cases. The decision is typically either a "yes" or "no" decision about whether a case belongs to a particular class (e.g. spam email or not), or a decision regarding which of plural classes (or categories) a case belongs to. Classifiers that are able to make decisions with respect to multiple classes are referred to as multiclass classifiers. Classifiers that make decisions regarding whether cases belong to a single class are referred to as binary classifiers Classifiers make decisions by considering features associated with cases. These features may be Boolean values (e.g., whether the case has or does not have some property), numeric values (e.g., cost of a product or number of times a word occurs in a document), or some other type of feature. In one technique of feature identification, textual data in cases is decomposed into a "bag of words," and each word seen in any string associated with a case becomes a feature, reflecting either the word's presence (Boolean) or its prevalence (numeric).

To build a classifier, the classifier is trained using training cases, where each training case includes a set of features and a label with respect to a particular class. The label of a training case indicates to which class the training case belongs. The label can be a binary label that has two values: positive or negative with respect to the particular class.

BRIEF DESCRIPTION OF THE DRAWINGS

Some embodiments of the invention are described with respect to the following figures.

DETAILED DESCRIPTION

Figure 1:
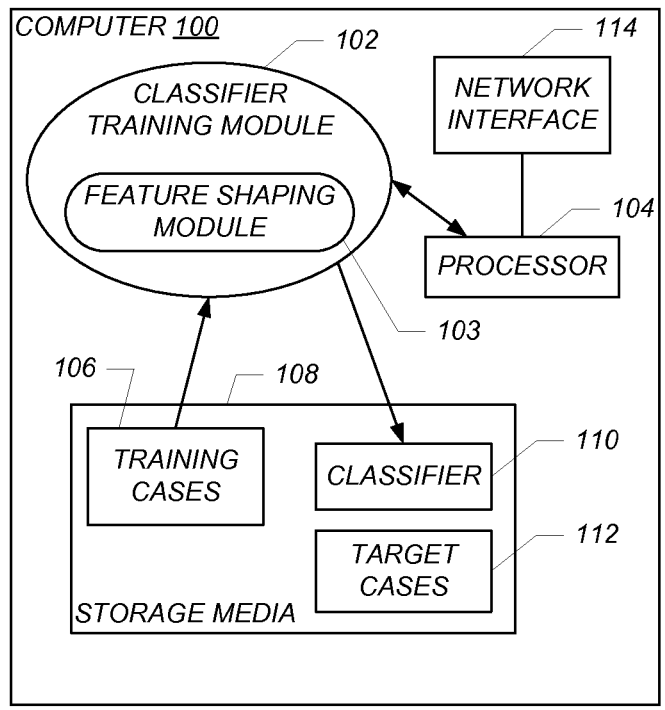
FIG. 1 is a block diagram of an example computer in which an embodiment of the invention is incorporated.

In accordance with some embodiments, when training a classifier, a mechanism or technique is provided to shape features of training cases to account for non-linear relationships between values of the features and the particular class for which the classifier is to be trained. The feature shaping is learned from the training cases. Once learned, the feature shaping is used in conjunction with the classifier when classifying future target cases. A "feature" refers to a numerical attribute that indicates a particular property of each case (e.g., an "age" feature for medical cases), and each such feature is used by the classifier to help predict whether a case belongs to one or more classes. A "case" refers to a data item that represents a thing, event, or some other item. Each case is associated with various features (e.g., age, product description, summary of a problem, time of event, and so forth). A "training case" includes features as well as a label that has been assigned a value to indicate whether or not that training case belongs to a particular class.

It is often implicitly assumed that the values of features have linear relationships with respect to the target class for which a classifier is to be trained. However, such an assumption may not be correct, which may result in a poorly trained classifier. A linear relationship between values of a feature and a particular class means that some delta increase (or decrease) in value of the feature will cause a linear effect on the output of a linear classifier for binary classification. However, such an assumption is unsuitable for many situations.

One example is in the medical domain, where a feature can be blood pressure, and where this feature is used to predict whether or not a heart attack may occur. In this example, the class for which a classifier is to be trained is "heart attack." High values (above some threshold) of the "blood pressure" feature are positively associated with the class "heart attack"—in other words, high values of the "blood pressure" feature are indications that a person is more likely to have a heart attack. Note, however, that the high blood pressure values that are positively associated with the "heart attack" class may be in a relatively small range, when compared to a much larger range of blood pressure values that do not provide good discrimination with respect to the class "heart attack." In this example, incremental increases in the values of the "blood pressure" feature do not have a linear effect on the classifier output (the classification of whether a particular case belongs or does not belong to the class "heart attack").

In another example, a target class may be "risk of death," and the feature being considered can be the driving speed of a car. In this example, the risk of death doubles for each 10 mph (miles per hour) over 50 mph. However, no such relationship exists for speeds below 50 mph. Thus, in this example, the feature values (driving speed) are also non-linearly related to the output.

Conventional techniques of training classifiers that assume linear relationships between feature values and the classifier output may result in inaccurate classifiers. However, in accordance with some embodiments, to improve the accuracy of a trained classifier that is trained using a set of labeled training cases, feature shaping is performed on the feature values of the training cases. Feature shaping is accomplished by computing mapping functions based on the training cases. Each mapping function applies a non-linear transformation onto values of a corresponding feature. The transformed feature values are then used to train a classifier.

In accordance with some embodiments, the shaping (or transformation) of features is performed using an automated algorithm that does not involve manual interpretation or analysis. The automated algorithm involves automatically deriving the mapping functions for applying the shaping. By being able to perform automated transformation of features, an efficient mechanism is provided to shape features to allow the building of a more accurate classifier.

FIG. 1 is a block diagram of an exemplary arrangement in which an embodiment of the invention can be incorporated. In the example of FIG. 1, a computer 100 includes a processor 104 and a storage media 108. The storage media 108 can be implemented with one or more disk-spaced storage devices and/or one or more integrated circuit or semiconductor memory devices. Note that "computer" can refer to either a single computer node or multiple computer nodes that can be distributed across one or more networks.

A classifier training module 102 is executable on a processor 104. The classifier training module 102 is able to take as input training cases 106 stored in the storage media 108. Using the training cases 106, and by applying an algorithm by a feature shaping module 103 that shapes features of the training cases 106 according to some embodiments, the classifier training module 102 is able to build a classifier 110, which is shown as being stored in the storage media 108.

As examples, the classifier 110 can be any one or more of the following: a support vector machine (SVM) classifier, a logistic regression classifier, a perceptron classifier, a linear discriminant analysis (LDA) classifier, and so forth. A classifier can be a linear classifier or a non-linear classifier. In this discussion, it is assumed that the classifier 110 is a binary classifier that is able to classify cases with respect to a particular class. However, the techniques or mechanisms according to some embodiments can also be applied to multi-class classifiers that are able to perform classifications with respect to multiple classes.

The trained classifier 110 can be used to classify additional cases, referred to as target cases 112, which are separate from the training cases 106. The trained classifier 110 is able to classify each of the target cases 112 with respect to a particular class.

The classifier 110 can be executed in the computer 100. Alternatively, the classifier 110 can be provided to a remote location (e.g., a remote computer), such as by communication through a network interface 114 of the computer 100. The classifier 110 can be executed at the remote location to classify target cases.

As noted above, to perform transformations of features of the training cases 106, mapping functions are derived. These mapping functions can be provided with the trained classifier 110, such that the mapping functions can be applied to features of target cases to transform the features of the target cases as part of the classification performed by the classifier 110. In this manner, classifications performed by the classifier 110 can account for non-linear relationships between feature values and the target concept (the class for which the classifier 110 is to perform classification).

In accordance with some embodiments, in addition to performing feature shaping to more linearly correlate features with the target concept (class), the classifier training module 102 can also discriminate among the features—in other words, determine which features are considered to be more predictive of the target class than other features. In accordance with some embodiments, the identified "better" features are provided with wider ranges of values so that they will have greater influence over the classifier.

Figure 2:
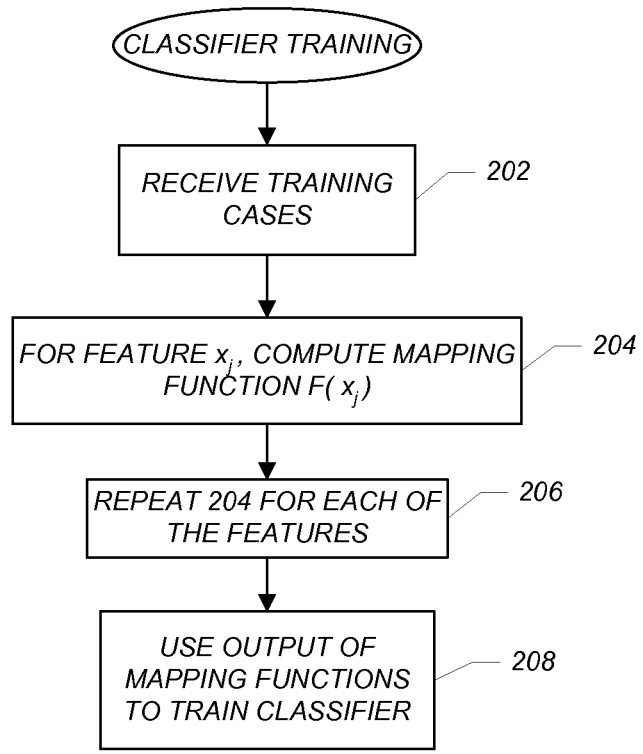
FIG. 2 is a flow diagram of a process of training a classifier, according to an embodiment.

FIG. 2 illustrates a general process according to an embodiment. The process of FIG. 2 can be performed by the classifier training module 102 of FIG. 1, for example. A set of training cases ("training set") is received (at 202). The training cases can be represented as follows:

$$\{(u_1,y_1),(u_2,y_2),\ldots,(u_m,y_m)\}$$

where $m \geq 1$ (often a hundred or more, for example), each $(u_i,y_i)$ represents a training case, each $u_i$ (i=1 to m) is a d-dimensional vector that is made up of d features ($d \geq 1$), and each $y_i$ represents the value of a class label for the ith training case. In some embodiments, the value of the class label $y_i$ can be one of two binary values (0 or 1).

In other embodiments that involve multi-class classification, the class label can be one of n distinct class values. In such cases, the multi-class classification task is decomposed into a set of binary classification sub-tasks. Various techniques relating to decompositions of multi-class tasks are available. For example, one technique considers each class versus the other classes, which yields n binary sub-tasks. Techniques described here can then be applied to each of these binary sub-tasks independently. The final step of the decompositions is to combine the final outputs of the binary sub-task classifiers into a single output for the multi-class classifier, typically by selecting the single class whose sub-classifier has the largest output. Thus, according to some embodiments, multi-class tasks are processed by decomposing them into a set of binary classification tasks. In the ensuing discussion, reference is made to embodiments that involve binary classifiers.

In accordance with some embodiments, each of the d features are considered separately and independently; in other embodiments, only a single pre-selected feature is processed. The ensuing discussion focuses mostly on the processing performed for a single one of the d features; such processing can then be repeated this for other features. Independent processing is performed for each feature, with each processing following the same procedure, unaffected by what other features are also being transformed.

Let the single selected feature j (in the range 1 to d) be represented by the vector $x_j$, which contains the jth feature values for all m of the labeled training cases. For the selected feature $x_j$, a mapping function $F(x_j)$ is computed (at 204) based on the vector $x_j$ and the corresponding training labels $y_1 \ldots y_m$. The mapping function $F(x_j)$ applies a non-linear transformation to the values of the feature $x_j$, and these new values are substituted into the feature vectors $u_i$ of the m training cases.

For embodiments that process all features, the computation performed at 204 is repeated (at 206) for each of the features j=1 to d, producing d different mapping functions.

The labeled training cases with their transformed feature values are used (at 208) for training the classifier 110. Each of the mapping functions are retained for later use when a new, unlabeled case is presented to the classifier for classifying.

There are various different implementations of the mapping function $F(x_j)$. In one relatively simple embodiment, the mapping function $F(x_j)$ can be expressed as follows:

$$F(x_j) = \frac{c_1(x_j)}{c_1(x_j)+c_0(x_j)}, \quad \text{(Eq. 1)}$$

where $c_0(x_j)$ represents a count of the number of negatively labeled training cases in which the feature j assumes a certain value $x_j$, and $c_1(x_j)$ represents a count of the number of positively labeled training cases in which the feature assumes a certain value $x_j$. In this example, class 1 is considered to be the positive class, and class 0 is considered to be the negative class. Thus, $c_1(x_j)$ is the count of the number of times the feature value $x_j$ is positively correlated to (or associated with) the target class among the training cases, and $c_0(x_j)$ is the count of the number of times the feature value $x_j$ is negatively correlated to the target class (or associated with the negative class). In some embodiments, $c_0(x_j)$ and $c_1(x_j)$ count the number of training cases having feature values within a specified distance of $x_j$. In other embodiments, the $x_j$ values are discretized into particular bins, and the $c_0(x_j)$ and $c_1(x_j)$ functions count the number of training cases in the bin into which $x_j$ belongs.

The mapping function $F(x_j)$ of Eq. 1 above performs proportional shaping of the feature $x_j$, where the proportional shaping is based on the proportion of the number of relevant cases, $c_1(x_j)$, whose jth feature has value $x_j$. (Some embodiments may include in Eq. 1 Laplace smoothing to make the function output less erratic with small counts, such as by adding one to the numerator and two or another constant to the denominator.)

Figure 3:
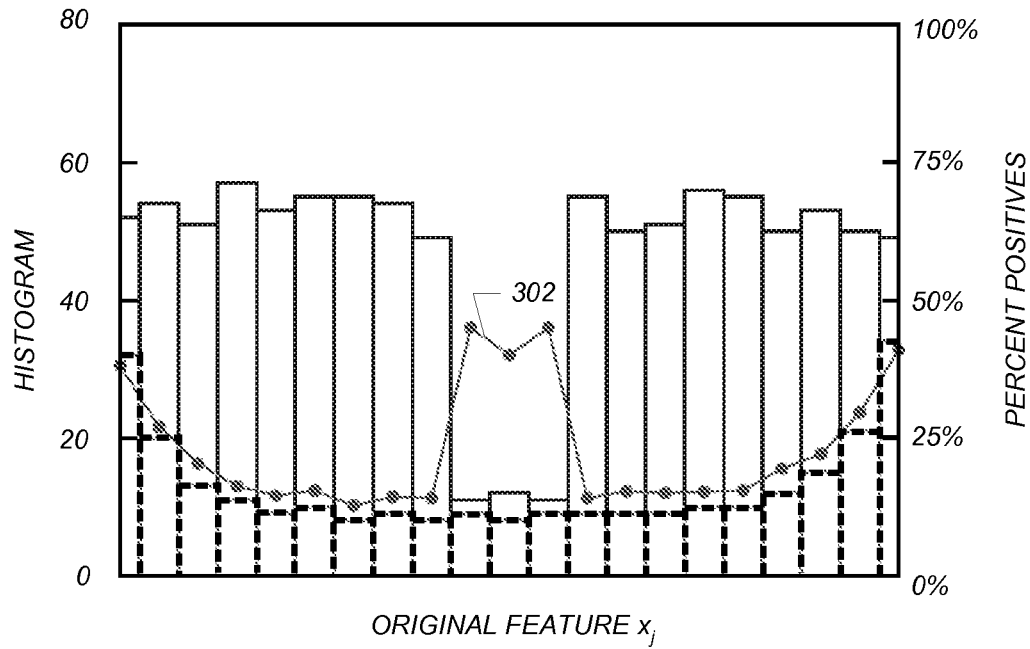
FIGS. 3 and 4 are example graphs to illustrate transformation of original feature values to transformed feature values, according to an embodiment.
Figure 4:
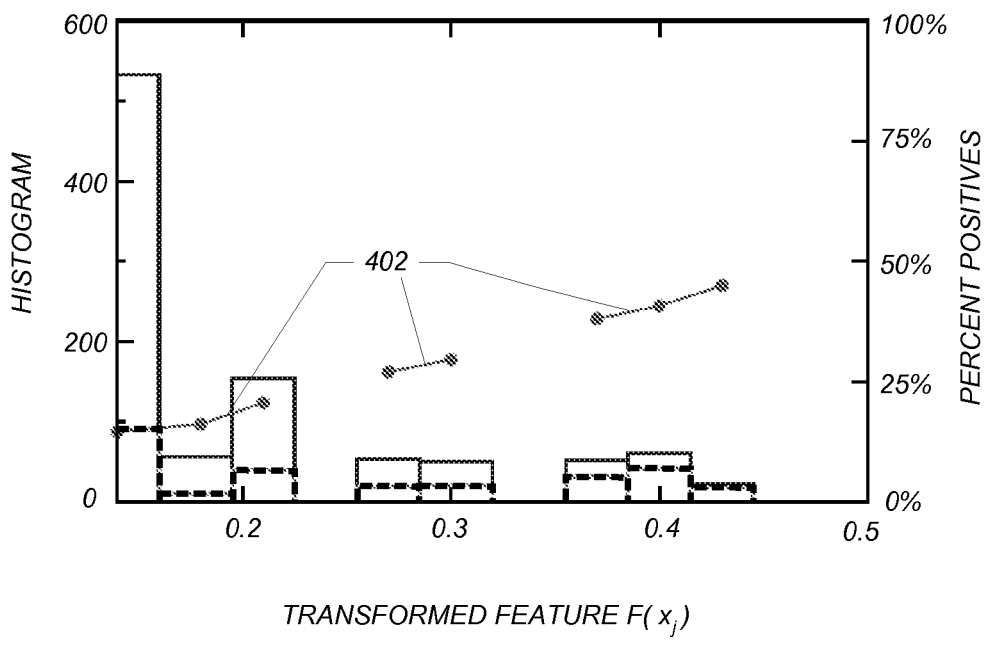

FIGS. 3 and 4 illustrate an example of proportional shaping. In FIG. 3, the horizontal axis represents the values of the original feature $x_j$. The $x_j$ values are divided into discrete bins, where each bin has a predefined width along the horizontal axis. Effectively, a histogram is built based on discretizing the $x_j$ axis. The vertical axes represent two scales: (a) the left-hand vertical axis represents a count of the number of training cases (the number of positive cases in each bin is represented by dashed bars, while the number of negative cases in each bin is represented by solid bars); and (b) the right-hand vertical axis represents the percentage of positive training cases in each bin, shown by the bold dots connected by curve 302. The curve 302 illustrates the non-linear relationship between the original feature $x_j$ values and the likelihood that cases are positive. As is apparent in FIG. 3, the likelihood of encountering a positive case does not correlate linearly, either positively or negatively, as the value of $x_j$ increases. In this case, the relationship is not even monotonically increasing or monotonically decreasing.

According to Eq. 1 above, the transformation that is applied to feature values is proportional shaping. Effectively, proportional shaping causes the original $x_j$ values to map to the percentage values represented by the dots along curve 302 of FIG. 3.

The transformed feature, represented as $F(x_j)$, is shown in FIG. 4. The transformed feature $F(x_j)$ is expressed as percentage values along the horizontal axis. FIG. 4 also shows a histogram of the same training set, where feature $x_j$ in each case has been transformed using $F(x_j)$. After this transformation, a substantially linear relationship now exists between the transformed feature values $F(x_j)$ and the likelihood of a training case being positive with respect to the particular class, as illustrated by a curve 402 connecting dots that represent percentages of positives in respective bins of the transformed feature values $F(x_j)$.

Although the curve 402 is not perfectly linear between transformed feature values $F(x_j)$ and percentages of positives, it is substantially more linear than the curve 302.

In an alternative embodiment, instead of generating mapping functions based on proportional shaping, as discussed above, log likelihood ratio shaping mapping functions are employed, as defined as follows:

$$F(x_j) = \log(p_1(x_j)) - \log(p_0(x_j)), \quad \text{(Eq. 2)}$$

where $p_0(x_j) = P(x_j|\text{class } 0))$, which represents the probability of the feature assuming a certain value $x_j$ while being conditioned on the fact that the case belongs to class 0, and $p_1(x_j) = P(x_j|\text{class } 1)$ represents the probability of the feature assuming a certain value $x_j$ while being conditioned on the fact that the case belongs to class 1.

The functions $p_0(x_j)$ and $p_1(x_j)$ are probability density functions. The probability density function of a variable is a function that can be integrated to obtain the probability that the variable takes a value in a given interval. The log likelihood ratio shaping of a feature captures the difference in likelihood of two classes (positive class and negative class) estimated based on the probability density functions.

If the features of the cases have discrete values, then a probability density function for a feature is estimated by simply counting the number of times that the feature has a certain value $x_j$ while being conditioned on the fact that the corresponding case belongs to a positive or negative class (class 1 or class 0, respectively). In this case, the probability density functions $p_0(x_j)$ and $p_1(x_j)$ are proportional to the counts $c_0(x_j)$ and $c_1(x_j)$ described above. If there are gaps in the discrete values, smoothing can be performed to fill in gaps in the discrete values of the feature, in some implementations.

However, if the features have continuous values, then one of various different techniques can be employed to estimate a probability density function for a particular feature. In one example, the values of the feature can be discretized, and the discrete values can then be counted to estimate the probability density function as discussed above.

Alternatively, a parametric technique can be used to fit an appropriate density function to estimate parameters of the probability density function. As another example, a non-parametric technique such as a kernel density estimation or Parzen window estimation technique can be used to obtain the probability density function. In one parametric embodiment, the probability density function is given a functional form, such as a Gaussian distribution with mean p and standard deviation a, and the constants of this functional form are estimated from the training data using standard statistical methods. In a different, non-parametric embodiment, the probability density function at a position $x_j$ is determined by overlaying a kernel, typically a Gaussian shape, over the training set items at that position and determining a weighted count of training cases, where the weights are provided by the kernel.

As yet another alternative, to estimate the probability density functions, the occurrences of each class are counted in a window of fixed size around the point for which conditional distribution is to be estimated.

In some embodiments, the mapping functions can be implemented as lookup tables that are stored for later access. A lookup table maps original feature values $x_j$ to corresponding transformed feature values $F(x_j)$. For a particular input value of a particular feature, the corresponding lookup table can be accessed to obtain an output value that is based on the mapping function $F(x_j)$. If a particular input value of a feature is not in the lookup table, then interpolation or another technique can be applied to estimate the corresponding output value.

In another embodiment, instead of using proportional shaping or log likelihood ratio shaping feature shaping, a k nearest neighbor (kNN)-based shaping can be employed, where $k \geq 2$. In this embodiment, the mapping function is defined as $$F(x_j) = \frac{c_1'(x_j)}{c_1'(x_j) + c_0'(x_j)}. \quad \text{(Eq. 3)}$$

Note that Eq. 3 above is similar to Eq. 1 for proportional shaping. However, in Eq. 3, the counts $c_0'(x_j)$ and $c_1'(x_j)$ are based on the k nearest neighbors (the k cases having the closest $x_j$ values) of a particular value of a feature $x_j$. For example, if k is equal to 30, then $c_0'(x_j)$ would be calculated by counting the number of negative cases among the k nearest neighbors. The count $c_1'(x_j)$ is similarly defined for positive cases.

Referring to FIG. 3, if kNN-based shaping is used, then each dot in FIG. 3 would represent the percentage of positives based on the number of positives (divided by k) among the k nearest neighbors of the corresponding particular value of $x_j$.

Figure 5:
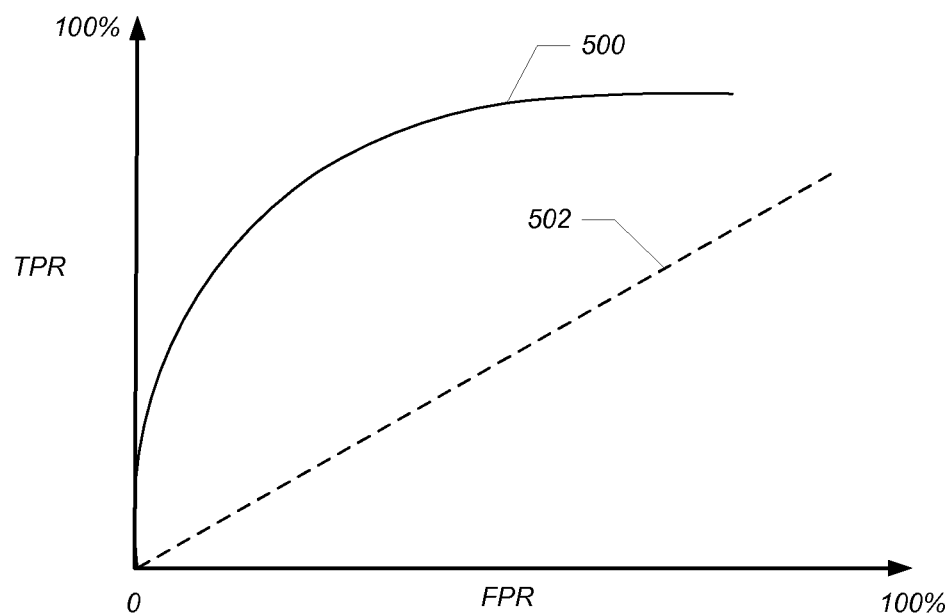
FIG. 5 is an example graph of using a receiver operating characteristic (ROC)-based technique of applying transformation of original feature values, according to another embodiment.

In an alternative embodiment, the feature shaping used is ROC-45 shaping, which is based on defining a receiver operating characteristic (ROC) curve. FIG. 5 illustrates a graph containing an example ROC curve 500, where the horizontal axis of the graph represents the false positive rate (FPR), and the vertical axis of the graph represents the true positive rate (TPR), which is also referred to as "recall." The false positive rate refers to the rate at which a classifier classifies a case as being positive with respect to a class when in fact the case is negative with respect to the class. The true positive rate refers to the rate at which a classifier correctly classifies a case as being positive with respect to the class.

To develop the ROC curve 500 as shown in FIG. 5, the true positive rate and false positive rate of the feature is estimated, at each possible value of $x_j$. With the ROC-45 shaping technique, the ROC curve is projected onto the 45° line, which is a line 502 that starts at point (0,0) and continues at a 45° angle. Each point on the ROC curve 500 is represented as $\{TPR(x_j), FPR(x_j)\}$, and projecting the ROC curve 500 onto the 45° line 502 causes the ROC curve 500 to be rotated by 45°. The mapping function using this technique is defined as follows:

$$F(x_j) = \frac{TPR(x_j) + FPR(x_j)}{\sqrt{2}}. \quad \text{(Eq. 4)}$$

In each of the shaping techniques discussed above, including proportional shaping, log likelihood ratio shaping, kNN-based shaping, and ROC-based shaping, the non-linear transformation performed for feature shaping is based on computing rates (or probabilities) of training cases having corresponding values of the original feature that are positive with respect to a target class.

Figure 6:
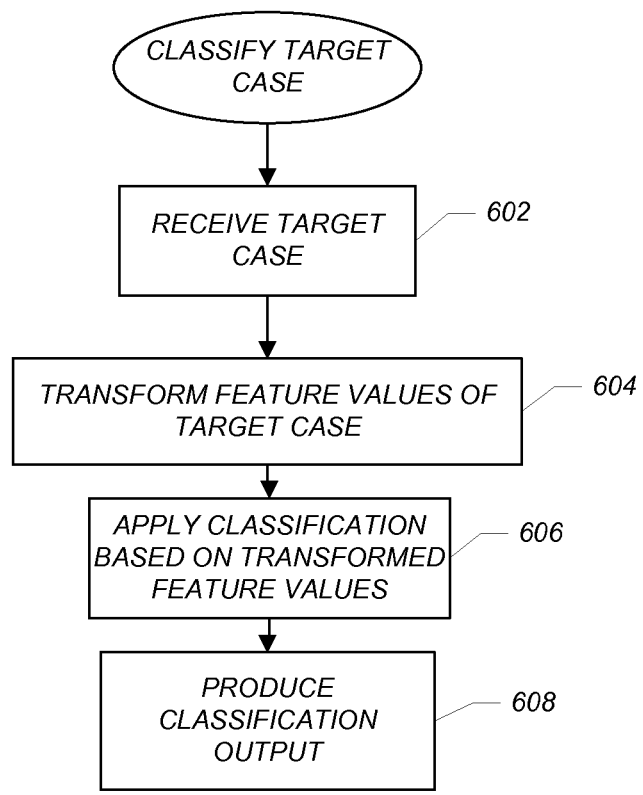
FIG. 6 is a flow diagram of a process of using a trained classifier according to an embodiment.

The classifier 110 (FIG. 1) that has been trained using shaped features can be used in a manner generally shown in FIG. 6. A target case to be classified is received (at 602) by the classifier. The classifier can then transform (at 604) values of the features of the received target case, by using the mapping functions or by using lookup tables according to the mapping functions. In one example, the classifier can access the lookup tables that correspond to corresponding mapping functions to derive transformed feature values. The classifier then applies (at 606) classification based on the transformed feature values. A classification output is then produced (at 608) by the classifier, where the output indicates whether or not the target case is positive or negative with respect to the particular class. Alternatively, the classification output can be a score that is intended to be proportional to the likelihood that the target case belongs to the particular class.

Figure 7:
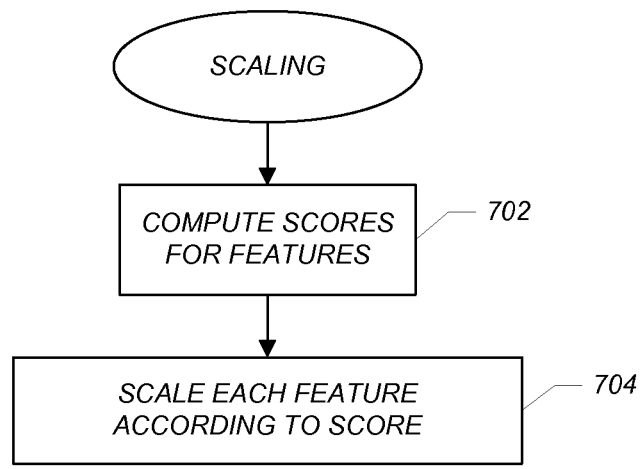
FIG. 7 is a flow diagram of a process of scaling features according to an embodiment.

As noted above, a further enhancement that can be applied (in addition to the reshaping discussed above) is to identify the "better" features and to provide wider ranges for such features. As shown in FIG. 7, scores are independently computed (at 702) for each feature. In one embodiment, the score can be a bi-normal separation (BNS) score. The BNS score is described in further detail in U.S. Patent Publication No. 2008/0101689 and U.S. Pat. No. 7,415,445. In other embodiments, other scoring metrics can be used, such as a scoring metric based on the Hellinger distance.

Each transformed feature is then scaled (at 704) according to its score. For example, the scaling can be such that the range of a feature is (0, score), where score is the BNS score or other score. The effect of performing scaling is that a larger range is defined for features that have higher scores (and thus are considered more predictive of a target class). The features with wider ranges tend to have a greater influence over the classifier.

By employing the feature shaping and/or scaling techniques discussed above, a more accurate classifier can be obtained.

Instructions of software described above (including the classifier training module 102, feature shaping module 103, and classifier 110 of FIG. 1) are loaded for execution on a processor (such as processor 104 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs across one or multiple computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving a collection of labeled training cases, wherein each of the labeled training cases has at least one original feature and a label with respect to at least one class;
   applying, by a computer using an algorithm, non-linear transformation on values of the original feature in the training cases to produce transformed feature values that are more linearly related to the class than the original feature values, wherein the non-linear transformation is based on computing probabilities of the training cases that are positive with respect to the at least one class; and
   using, by the computer, the transformed feature values to train a classifier.

2. The method of claim 1, further comprising:
   receiving a target case having the original feature for classification by the trained classifier;
   applying the non-linear transformation on a value of the original feature in the target case to produce a transformed feature value; and
   using the transformed feature values of the target case by the trained classifier to classify the target case with respect to the class.

3. The method of claim 1, wherein the labeled training cases further have a second original feature, the method further comprising:

applying non-linear transformation of values of the second original feature in the training cases to produce transformed second feature values; and using the transformed second feature values to train the classifier.

4. The method of claim 1, wherein the classifier is a multi-class classifier, wherein the receiving, applying, and using are performed for a first binary sub-task of the multi-class classifier, the method further comprising repeating the receiving, applying, and using for another binary sub-task of the multi-class classifier.

5. The method of claim 1, wherein applying the non-linear transformation of the values of the original feature comprises:

for a given value of the original feature, determining a proportion of the training cases having the given value of the particular original feature that are labeled positive with respect to the class.

6. The method of claim 5, wherein determining the proportion of the training cases having the given value of the original feature that are labeled positive with respect to the class comprises:

calculating a first count of the training cases having the given value of the original feature that are labeled positive with respect to the class;

calculating a second count of the training cases having the given value of the original feature that are labeled negative with respect to the class; and dividing the first count by a sum of the first count and second count.

7. The method of claim 5, wherein determining the proportion of the training cases having the given value of the original feature that are labeled positive with respect to the class is based on calculating a count of the training cases that contain k (k>2) nearest neighbors of the given value of the original feature that are labeled positive with respect to the class.

8. The method of claim 5, further comprising discretizing the values of the original feature into discrete bins, the first and second counts calculated with respect to the bins.

9. The method of claim 1, wherein applying the non-linear transformation of the values of the original feature comprises transforming the values of the original feature based on computing a first probability density function that represents a probability of the original feature assuming a given value while being conditioned on the fact that corresponding training cases are positive with respect to the class.

10. The method of claim 9, wherein transforming the values of the original feature is further based on computing a second probability density function that represents a probability of the original feature assuming the given value while being conditioned on the fact that corresponding training cases are negative with respect to the class.

11. The method of claim 10, wherein transforming the values of the original feature comprises calculating a difference between a log of the first probability density function and a log of the second probability density function.

12. The method of claim 1, wherein applying the non-linear transformation of the values of the original feature comprises transforming the values of the original feature by using points of a receiver operating characteristic curve.

13. The method of claim 12, wherein transforming the values of the original feature by using points of the receiver operating characteristic curve comprises calculating a difference between a true positive rate of a given value of the original feature and a false positive rate of the given value of the original feature.

14. The method of claim 1, wherein the training cases have plural features, the method further comprising:

computing scores for corresponding plural features of the training cases; and scaling the plural features according to the computed scores such that wider ranges are provided to features with higher scores.

15. A computer comprising:

a storage media to store labeled training cases that are labeled with respect to at least one class; and a processor to:

construct mapping functions that are learned from the labeled training cases;

use the mapping functions to apply corresponding non-linear transformations of original features in the training cases to produce transformed feature values from values of the original features; and use the transformed feature values to train a classifier.

16. The computer of claim 15, wherein each of the mapping functions is based on a rate of positive training cases having corresponding values of a corresponding one of the original features with respect to the class.

17. The computer of claim 16, wherein each of the mapping functions is calculated by computing a first count and a second count, wherein the first count is a count of the number of times the corresponding original feature assumes a given value while being conditioned on the fact that the corresponding training cases are positive with respect to the class, and wherein the second count is a count of the number of times the corresponding original feature assumes a given value while being conditioned on the fact that the corresponding training cases are negative with respect to the class.

18. The computer of claim 17, wherein each of the mapping functions is calculated by computing a first count and a second count, wherein the first and second counts are computed based on using k nearest neighbors of each given value of a particular one of the original features.

19. The computer of claim 16, wherein each of the mapping functions is calculated based on computing a true positive rate and a false positive rate.

20. An article comprising at least one non-transitory computer readable storage medium containing instructions that upon execution cause a computer to:

receive a collection of labeled training cases, wherein each of the labeled training cases has at least one original feature and a label with respect to at least one class;

construct a non-linear transformation based on the labeled training cases;

apply the non-linear transformation on values of the original feature in the training cases to produce transformed feature values that are more linearly related to the class than the original feature values; and train a classifier using the transformed feature values.

* * * * *

UNITED STATES PATENT AND TRADEMARK OFFICE
CERTIFICATE OF CORRECTION

PATENT NO.       : 8,725,660 B2                              Page 1 of 1
APPLICATION NO.  : 12/512243
DATED            : May 13, 2014
INVENTOR(S)      : George H. Forman et al.

It is certified that error appears in the above-identified patent and that said Letters Patent is hereby corrected as shown below:

In the Claims

In column 9, line 36, in Claim 8, delete "5," and insert -- 6, --, therefor.

Signed and Sealed this
Fourteenth Day of October, 2014

Michelle K. Lee
*Deputy Director of the United States Patent and Trademark Office*